United States Patent [19]

Day

[11] Patent Number: 4,655,165
[45] Date of Patent: Apr. 7, 1987

[54] DEVELOPMENT APPARATUS FOR LATENT IMAGES ON SUPPORTED SHEETS

[75] Inventor: Gene F. Day, Cupertino, Calif.

[73] Assignee: Precision Image Corporation, Redwood City, Calif.

[21] Appl. No.: 796,872

[22] Filed: Nov. 12, 1985

Related U.S. Application Data

[63] Continuation-in-part of Ser. No. 763,040, Aug. 6, 1985.

[51] Int. Cl.⁴ ............................................. G03G 15/06
[52] U.S. Cl. .................................... 118/647; 118/660; 118/662
[58] Field of Search ......................... 118/647, 660, 662

[56] References Cited

U.S. PATENT DOCUMENTS

| | | | |
|---|---|---|---|
| 3,876,448 | 4/1975 | Savit et al. | 117/37 |
| 3,916,829 | 11/1975 | Yamada et al. | 118/647 |
| 3,952,702 | 4/1976 | Levy | 118/637 |
| 4,146,324 | 3/1979 | Komori et al. | 118/647 X |
| 4,270,859 | 6/1981 | Galbraith et al. | 355/10 |
| 4,278,345 | 7/1981 | Davis et al. | 355/15 |
| 4,482,242 | 11/1984 | Moraw et al. | 355/10 |

Primary Examiner—Bernard D. Pianalto
Attorney, Agent, or Firm—Thomas Schneck

[57] ABSTRACT

A toning shoe for applying fluid developer to a latent image on a supported sheet. A drum is a preferred support, with a toning shoe having raised edges, a central recessed area contacting the sheet and a drain. Fluid developer is injected into the shoe under pressure from an opening and flows to the drain, contacting the sheet between the opening and the drain, and then is collected and recycled back to the shoe. The shoe is moved laterally as the drum rotates so that development occurs in a stripe pattern.

20 Claims, 12 Drawing Figures

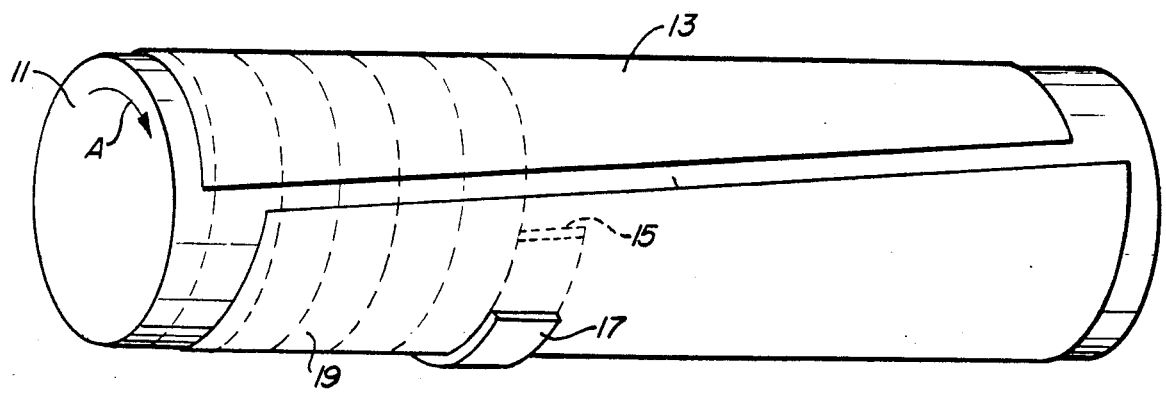
FIG._1
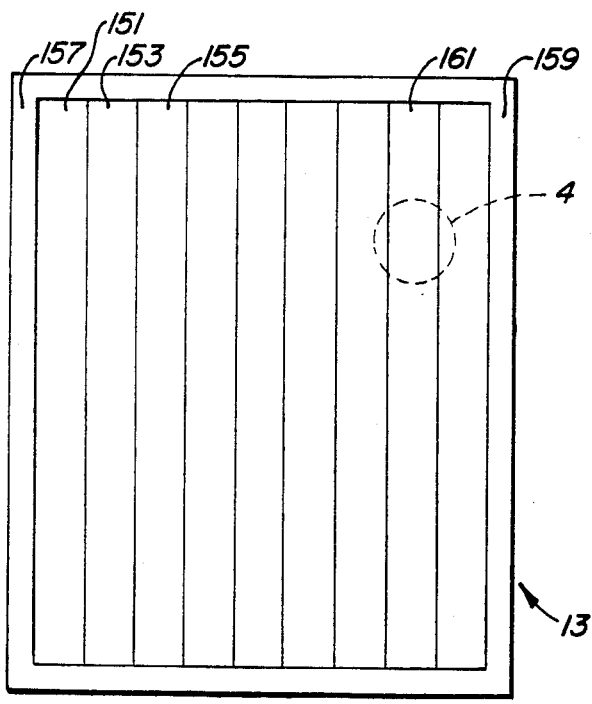
FIG._3
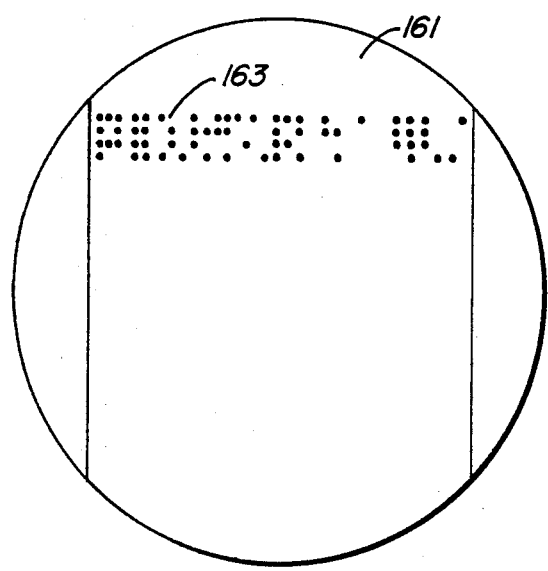
FIG._4
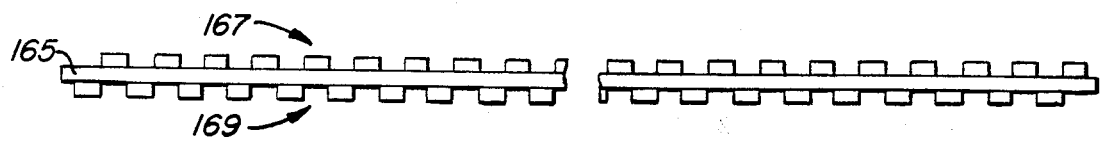
FIG._6

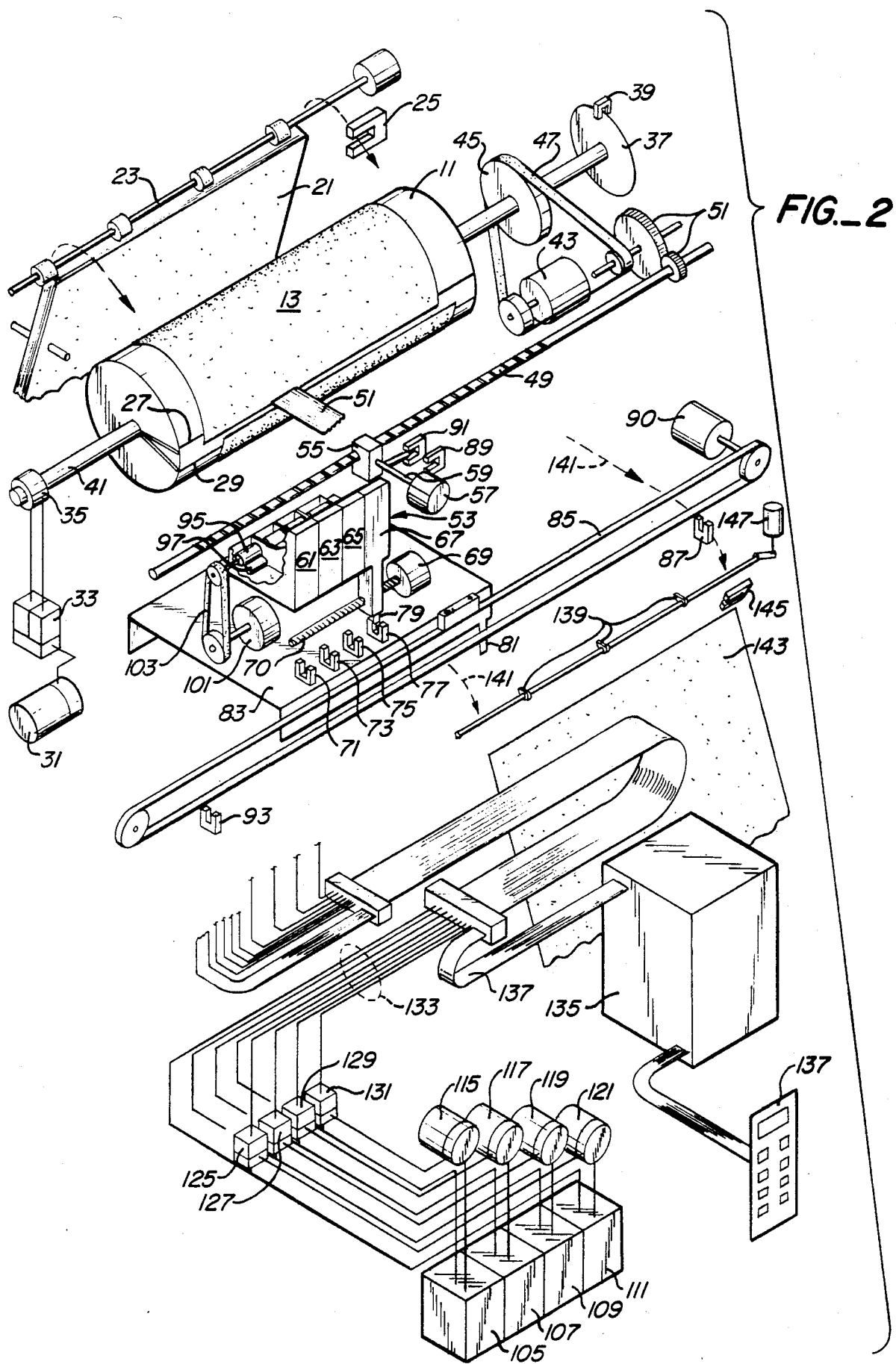
FIG._2

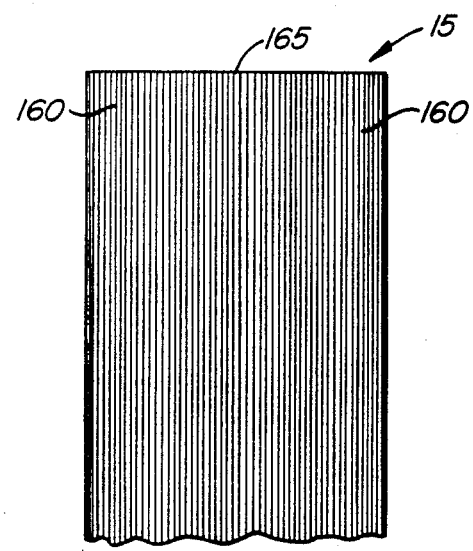
FIG._5
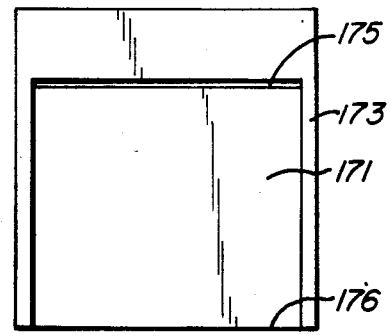
FIG._7
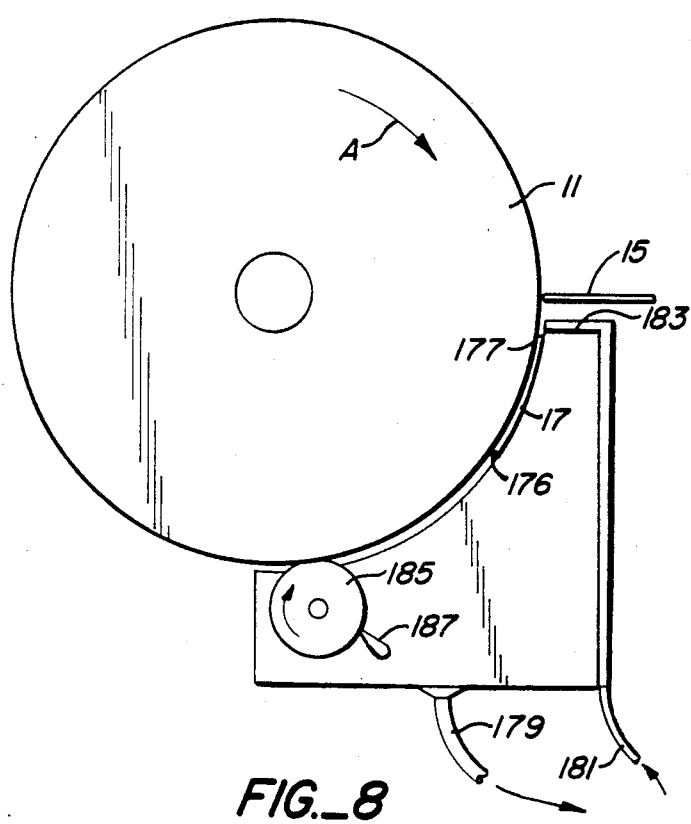
FIG._8
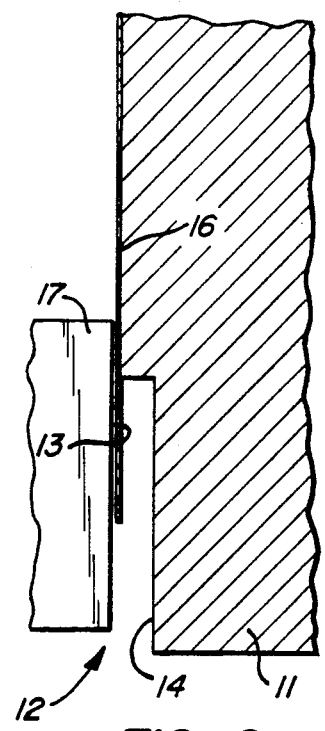
FIG._9

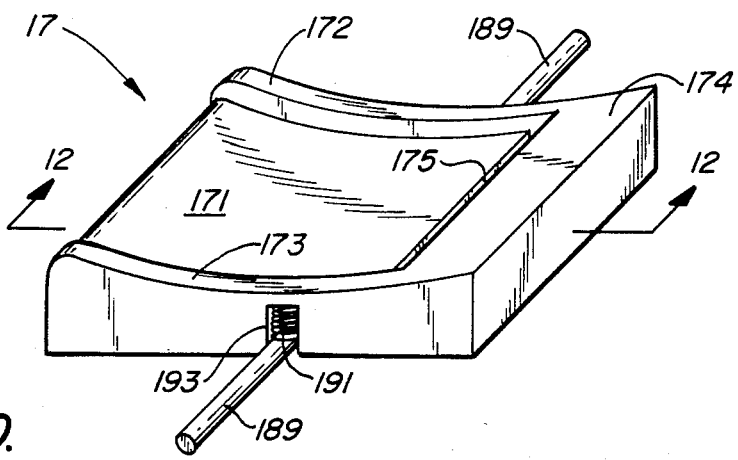
FIG._10.
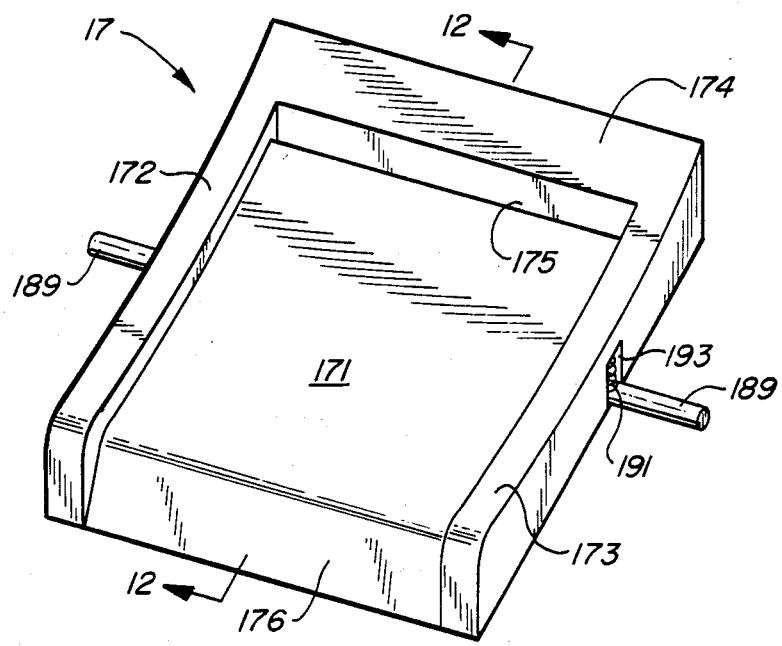
FIG._11.
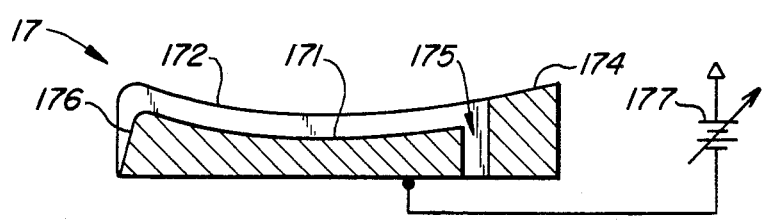
FIG._12.

DEVELOPMENT APPARATUS FOR LATENT IMAGES ON SUPPORTED SHEETS

CROSS REFERENCE TO RELATED APPLICATION

This application is a continuation-in-part of U.S. patent application Ser. No. 763,040, filed Aug. 6, 1985.

DESCRIPTION

1. Technical Field

The invention relates to developing of latent images and more particularly to a structure for applying a fluid developer to supported sheets in order to develop a latent image into a visible image.

2. BACKGROUND ART

In electrostatic drum printing on sheets, such as in facsimile machines, an electrostatic latent image on the sheets is developed into a visible image, usually by applying a liquid suspension of toner particles to the sheets. The developer typically must remain in contact with the sheets for about one second to obtain an adequate image contrast. Attempts have been made to increase the rate of printing by increasing the speed of rotation of the drum. However, this sometimes results in a loss of image contrast or density.

In U.S. Pat. No. 4,482,242 to Moraw et al., a latent charge image on a drum is developed by moving the drum through a pool of developer liquid in a developing shoe. The excess liquid is removed by spillage off the edges of the shoe, and by a fast moving roller contacting the drum.

U.S. Pat. No. 4,270,859 to Galbraith et al. provides a pre-wet shoe for depositing a liquid dispersant onto photoconductive paper before development, and a toner shoe adjacent to the paper for applying toner to a latent image on the paper. The toner fluid flows in the shoe to the paper, then downhill along the paper to an outlet of the shoe.

In copending U.S. application Ser. No. 763,040 assigned to the assignee of the present invention, a drum printer features a print element or head with a linear array of closely spaced charging elements for writing an electrostatic latent image helical stripe pattern on a sheet mounted on the drum. When the sheet is laid out, the stripe pattern consists of adjacent columns of digital multi-bit words forming an image. Such print heads are faster than those which only print a single helical raster line at a time, yet without the expense involved with full width line printer heads.

It is desirable to devise a development electrode that allows the use of a print head with helical stripe scanning thereby obtaining a faster printing speed. An even faster print speed could be obtained if the time of fluid developer contact with the sheet could be reduced to less than a full second. However, it is imperative that vital image contrast not be lost.

An object of the invention is to devise a developer applicator for a supported latent image, particularly a structure which allows helical stripe pattern printing.

DISCLOSURE OF THE INVENTION

The above object has been met with a developer applicator structure, called a "toning shoe", which applies a flowing stream of fluid developer to a supported sheet having a latent image thereon. In the case of a drum-supported sheet, the shoe is made to scan the sheet in a helical stripe pattern. The toning shoe has raised arcuate peripheral edges contacting the sheet near opposed lateral edges of the stripe and a central, recessed area very closely spaced from the sheet. The shoe has a slit near a leading upper edge of the shoe for injecting fluid developer under pressure in the space between the sheet and the recessed area of the shoe. Developer flows toward a spillway defined in a lower edge of the shoe to a sump for recycling.

One advantage of the present invention is that fluid developer or toner is applied to a localized area during drum rotation, corresponding to a helical column or helical stripe. The raised peripheral edges or rims confine the toner only to the stripe being developed, and in addition provide that the recessed area is very close to the sheet. This close spacing increases the deposition of developer so that only brief developer contact is needed to develop the latent image to the desired resolution. The shoe is physically simple so it is inexpensive and can be easily cleaned by periodically wiping it off. A number of shoes applying different developers, one for each primary color, may be used to develop color images.

For developing electrostatic latent images on a sheet the recessed area is an electrode, while raised edges are insulating structures. The fluid developer is then a liquid toner.

As the drum rotates, the toning shoe is moved laterally parallel to the drum axis with the shoe contacting the supported sheet so that developer flowing in the shoe is directly applied to the sheet. A helical stripe, scanning pattern results.

BRIEF DESCRIPTION OF THE DRAWINGS

FIG. 1 is a simplified perspective view of a drum supported sheet and toning shoe in accord with the present invention.

FIG. 2 is an exploded detailed plan perspective view of a printer apparatus employing the toning shoe of the present invention.

FIG. 3 is a layout view of a sheet illustrating the scanning pattern of the apparatus of the present invention.

FIG. 4 is a detail of the sheet illustrated in FIG. 3.

FIG. 5 is a partial top view of a scanning head employed in the printer of FIG. 2.

FIG. 6 is a magnified front edge view of the scanning head illustrated in FIG. 5.

FIG. 7 is a front view of a toning shoe in accord with the present invention.

FIG. 8 is a side plan view of a sheet-supporting, rotating drum with a print head and toning shoe.

FIG. 9 is a sectional view of an edge of the drum of FIG. 8, with a sheet supported thereon and a toning shoe adjacent to the sheet.

FIG. 10 is a side perspective view of a toning shoe of the present invention with spring mounting.

FIG. 11 is a front perspective view of the toning shoe illustrated in FIG. 10.

FIG. 12 is a side sectional view taken along the lines 12—12 in FIG. 11.

BEST MODE FOR CARRYING OUT THE INVENTION

The preferred embodiment of the invention involves toning of an electrostatic latent image on a sheet. However, other latent images, in non-electrostatic media, could also be developed. For non-electrostatic media, the electrodes described herein would not be needed.

With reference to FIG. 1, drum 11 may be seen supporting a sheet of paper 13 for rotation. While the drum rotates in the direction of arrow A, its axis is fixed and so the drum does not translate laterally, only rotationally. An electrostatic head, for creating an electrostatic latent image, is in contact with the paper 13 at location 15. The head is translated laterally, parallel to the axis of the drum 11. The head has a forward edge in contact with the sheet 13, with a linear array of 1024 wires forming charging elements in very close proximity to the sheet 13. The number of wires may range between 100 and 10,000. Sheet 13 is coated so that it is a charge retaining dielectric medium. The drum operates at electrical ground or at a positive potential. The charging elements are at a negative potential of 400 to 600 volts relative to the drum. Polarities may be reversed. No electrical current is intended to flow through the paper coating.

A toning shoe 17, following head 15, applies liquid toner to the electrostatic latent image existing in the charge pattern deposited onto the sheet for developing the image. The head and toning shoe move together laterally and continuously so that a helical stripe pattern 19, indicated by dashed lines, is traced on sheet 13 by the relative motion of the head and shoe on the one hand and the drum on the other hand. Toning shoe 17 supplies toner locally to the sheet on the stripe 19. A drying roller is used downstream of the toning shoe to remove excess developer from the sheet.

A printer employing such a toning shoe may be seen in more detail in FIG. 2. A sheet from a feeder 21 is driven by supply roller 23 through an optical sensor 25 onto drum 11. The purpose of optical sensor 25 is to time the position of the edge of the sheet when a sheet first passes through the sensor. It is important to time the sheet so that the proper position of the drum can be made available to receive the sheet.

The drum may have a pair of vacuum channels 27 and 29 which are passages embedded in the drum having pumped apertures for holding sheet 13. Preferably, the channels should be spaced to secure the top and bottom edges of a sheet. The channels are evacuated by means of a vacuum pump 31 having an output controlled by solenoids 33 which is then connected through a vacuum collar 35 to the two channels 27 and 29. The first vacuum channel 27 is used to secure the top of a sheet while the other channel secures the bottom. Thus, the top channel 27 must be in approximately a 12 o'clock position to receive a sheet coming through sensor 25. The position of the drum is known from an optical encoder 37 which is a film disk having a plurality of black and clear radial stripes thereon. The marks are read by another optical sensor 39.

The diameter of drum 11 is approximately 12 inches and its width is wider than sheets to be supported. The edge of the drum, extending from slightly inside the region of where paper is to be supported may be slightly relieved to prevent edge wetting when using fluid developers. The drum is rotated about its axial shaft 41 by means of a continuously rotating motor 43 turning pulley 45 by means of belt 47. Motor 43 also turns a lead screw 49 by means of gears 51. Lead screw 49 carries the head 15 as well as toner shoe assembly 53 and platform 83. Heat 15 and toner shoe assembly 53 are supported on a carrier assembly, not shown, which is connected to lead screw 49 by means of a retractable half nut 55. A solenoid 57 provides motion to an arm 59 which retracts half nut 55 from lead screw 49 on command. In the retracted position, no motion is imparted to the head, toning shoe assembly and platform by the lead screw. The retracted position is used for flyback, discussed below. At another command the solenoid 57 causes the half nut to come back into contact with the lead screw, thereby again providing motion to both the head and the toning shoe.

The toning shoe assembly 53 consists of four individual toning shoes 61, 63, 65 and 67. Each shoe is approximately the same width as the head 15. A motor 69 turns another screw 70, placing a selected toning shoe directly beneath head 15. Different shoes carry different color developers whereby a selected toning color may be dispensed from a toning shoe indexed to a position below the head by screw 70. A series of optical sensors 71, 73, 75, 77 senses the position of a finger 79 extending from one of the toning shoes 67. The finger indicates the position of the toning shoes relative to the head. An optical sensor consists of a light transmitter and detector, separated by a narrow space. When the light beam is interrupted, the sensor is activated. Thus, when the finger 79 passes through a sensor the position of toning shoe 67 is known. Since the other toning shoes are fixed in relation to toning shoe 67, their positions are also known.

As mentioned, each shoe applies a different color of toner to an image. For example, the toning shoe 61 may be the first toning shoe which is used and is directly centered below electrostatic head 15. This shoe may contain a toner which supplies a black color to the latent image. The second toning shoe 63 may supply a cyan color, a third toning shoe 65 may supply a magenta color and a fourth toning shoe 67 may supply a yellow color. In the position shown in FIG. 2 the black toning shoe 61 would be directly below head 15. After one complete scan of sheet 13 by the head 15 by movement along the lead screw from left to right, the toning shoe assembly is indexed to the left so that the second toning shoe, 63, carrying a cyan developer, is below head 15.

With half nut 55 in contact with lead screw 49, the shoe assembly 53 moves to the right as head 15 scans paper on rotating drum 11. Drum rotation is at about 20 rpm. When the head reaches the right hand edge of the paper, this is detected by a finger 81 extending from platform 83 on which the shoe assembly 53 is riding. The entire assembly is being driven by half nut 55. Although the platform is connected to belt 85, the belt is not driven until the finger 81 projects into the optical sensor 87. When this occurs, half nut 55 is retracted from lead screw 49 by solenoid 57 and the retracted position is sensed by an optical switch 89. In the retracted position, the head 15 and shoe assembly 53 are no longer driven. At this time, flyback motor 90 is energized and belt 85 is caused to move in the opposite direction, carrying platform 83, shoe assembly 53 and head 51 back to an initial position. The arrival of platform 83 at this initial position is sensed by optical sensor 93 sensing the finger 81. When this occurs, the solenoid 57 advances arm 59 until the optical sensor 91 senses the forward position of the arm, at which half nut engages lead screw 49.

In FIG. 2, the position of the toner shoe appears shown somewhat removed from the drum. The actual position of the toning shoe is one very closely spaced to the sheet 13, a central electrode portion of the shoe being separated from the paper by only a few mils. Each toning shoe carries a drying roller, such as roller 95, which removes 99 percent of the excess fluid from the sheet 13. A wiper blade 97 removes excess fluid from the wiper roller 95. The remaining two or three microns of fluid on the sheet evaporates in ten to twenty seconds. The roller 95 is powered by motor 101 transmitting rotary force through belt 103. Fluid developer or toner is supplied to the toning shoes from supply tanks 105, 107, 109 and 111. Pumps 115, 117, 119 and 121 transmit developer through solenoid valves 125, 127, 129 and 131 into flexible conduit 133 which goes to developer shoes 61–67. Each valve is a solenoid which operates at about 5 pounds per square inch. Each of the supply tanks 105–111 contains a color developer or toner corresponding to the colors of toner in shoes 61–67. Drain lines as shown return the spent toner to the appropriate supply tank.

An electrical control box 135 receives a block of digital data consisting of bits to be printed on a sheet. An operator may initiate printing through a control panel 137. The control box 135 divides the block of digital bits to be printed into columns to be sequentially transmitted to the printer one after another so that printing appears to be in the form of helical scanning of the paper, with one column continuously fed after another. A momentary pause in printing may be used in going from one column to the next at the top and bottom of a page where margins may exist or a gap in the wrap of a sheet about the drum. This may be achieved by turning valves 125, 127, 129 and 131 on and off. Within each column of data, the width of a column is taken as a digital word. This width corresponds to the writing width of the head. The pitch of the lead screw and the rate of rotation of the drum are synchronized so that columns abut, edge to edge, without overlap or gap. Use of liquid toner allows edges to blend so that they are not discernible in the final image. Each ditigal word is transmitted in a flat electrical cable 137 to head 51. A digital word, consisting of say 1,024 bits is transmitted to the head. A source of high voltage applied to the head allows the binary bits to be converted to electrical charge transferred onto sheet 13 by the linear array of wires in the head. Paper to be written upon is treated with a dielectric substance for charge retaining purposes. Such papers are commercially available, for example "Electrographic Paper" sold by Crown Zellerbach Corporation.

After printing a series of columns, which appear to be helical stripes and then toning with a developer of a first color, the head is caused to fly back for a second pass. After this is complete, the head is caused to fly back for a third scan with developer of the third color. Finally, upon completion of this scan, the head is again caused to fly back and then again scan across the paper applying toner in a fourth shoe, the toner shoes having been indexed one after another underneath the head by screw 70 and motor 69. Toners associated with primary colors may be used to form a color printed image. After the fourth pass, paper is released from drum 11 by releasing vacumm in the channels 27 and 29 and by moving the pickoff fingers 139 into contact with the drum, thereby causing sheet 13 to slide over the pickoff fingers as indicated by the dashed arrows 141 and sheet 143. Passage of the sheet 143 past the pickoff fingers is sensed by an optical sensor 145. The pickoff fingers are moved by a motor 147 which can adjust the fingers to move into ejection position once printing is oomplete. Control panel 137 has various status indicators for signalling printing progress as well as manual override controls for interrupting printer operation or resetting the printing.

FIG. 3 shows a sheet 13 consisting of columns 151, 153, 155, 161 and so on. A page margin 157 exists on the left hand side and a page margin 159 exists on the right hand side. In these page margins, no printing exists. The area of the paper accessible for printing must be a multiple of the width of the head. In the example of FIG. 3, nine columns are shown, each column being the width of the head. To print sheet 13 nine revolutions of the drum per color would be necessary, with page margin columns 157 and 159 being blank since the head did not pass over these regions. The lateral motion of the head is smooth and continuous so that when the paper sheet is wrapped about the drum, the columns appear to be a continuous helical spiral, without any spaces or overlap in the spiral pattern.

FIG. 4 illustrates a printing sample within a column indicated by the dashed circle 4 in FIG. 3. In FIG. 4, the head and a toner shoe has moved over column 161 developing a latent image and this latent image has been toned to form a dot pattern 163, the dots appearing to be in rows and columns. The maximum number of dots possible equals the number of wire elements in the head extending from side to side. The dot pattern of FIG. 4 is merely illustrative of the writing of digital words with bit patterns which span a column from edge to edge. The bit patterns consist of the presence and absence of charge which is made visible by toning. Where charge is applied, the image is toned, giving a dark dot appearance. Since the charge is quite localized, the pattern appears to be a grid-like array of dots. Each position in the array is an image pixel which is either dark or light depending upon whether charge was deposited in an array location.

FIG. 5 shows that the head 15 consists of a series of very fine wires 160 deposited on a very thin circuit board 165. It is possible to use charging elements other than wires, but in this case wires present a manufacturing advantage. The wires extend completely across the board, on upper and lower surfaces. This is illustrated in FIG. 6 where the board 165 is seen end-on. It has an upper set of wires 167 and a lower set of wires 169. The board itself is only about 2.5 mils thick. The wires or charging elements are positioned at a density of more than 150 wires per centimeter or about 400 wires per inch, with 512 wires per side and an air or other insulative gap between adjacent wires so that they do not short each other out. As may be seen, the wires are slightly offset from each other, with a total of 1024 wires on two sides. This number is selected because it is convenient for digital processing. The wires 167 and 169 are parallel, mutually insulated traces which are plated onto board 165 using well-known photolithographic techniques. One of the advantages of the present invention is that the head used herein is relatively inexpensive compared to line printer heads and other full width electrostatic heads which are very expensive.

In FIG. 7, a detail of a toning shoe is seen. The shoe has a U-shaped rim 173 with a base, opposed parallel arms and an open drain opposite the base. Within the boundary formed by the rim is a central recessed electrode region 171, less than ten mils and typically about five mils deep. The raised peripheral edge or rim 173 is brought into contact with paper being scanned. The rim is about one-eighth inch wide on opposed sides and about one half inch wide at the base which is seen as the upper or leading edge. Developer slit 175, near the leading edge, applies developer onto a charged sheet, immediately below the head and the developer is allowed to pass through the recessed area 171 to drain or spillway 176 defined in a lower edge and is then collected for recycling.

In FIG. 8, the drum 11 is seen to be rotating in the direction indicated by the arrow A. The electrostatic head 15 is in mechanical contact with a paper sheet mounted on the drum, applying charge thereto. A toning shoe 17, having an arcuate peripheral shape facing the drum applies toner to a localized area corresponding to a column or a latent image stripe. The latent image created by the head 15 is thus toned and formed into a visible image. Toner applied at the upper portion of the shoe 177 is allowed to pass through the central recessed area of the shoe and then fall past spillway 176 into a sump for collection through drain tube 179. New developer is supplied through the inlet tube 181 and flows through the wall of the shoe to a supply port 183 where the supply of developer is replenished and injected into the shoe for application to the sheet. The drying roller 185 is seen to be carried within the same housing as the shoe and contacts drum 11 for removing excess developer. Once the excess is removed, it is scraped from the drying roller by a scraper blade 187. Again, excess developer falls into the sump for collection and recycling.

With reference to FIG. 9, an exploded detail of drum 11 is seen. An edge of the drum 12 has a recessed shoulder 14 which is approximately one-quarter inch below the principal drum surface 16. The sheet of paper 13 overhangs the main drum surface 16 by a fraction of an inch. If the toning shoe 17 passes over overhanging portion 13, excess developer will run down the face of the shoe and avoid contact with drum 11. Without the presence of the recessed shoulder, developer would enter the small space between sheet 13 and drum 11 and by capillary action spread onto the back side of sheet 13 and onto the main drum surface, causing a buildup of toner on the drum. This leads to deterioration of the drum surface, since a residue of toner particles accumulates on the drum. The recessed shoulder portion 14 exists on opposite sides of the drum.

In FIG. 10, a toning shoe 17 is attached to a carriage, not shown, by a support rod 189, so that the toning shoe may reside in a relation relative to a drum in a manner shown in FIG. 8. A pair of springs 191, each in a notch 193 formed in left and right peripheral edges 172 and 173 connects to rod 189. Springs 191 urge the toning shoe 17 into contact with the sheet on a drum.

With reference to FIGS. 11 and 12, the toning shoe 17 shown has raised peripheral edges or rims 172, 173 and 174 and a central recessed electrode portion 171. Toning shoe 17 is typically 2 inches long and 2.56 inches wide. Rims 172, 173 and 174 contact and conform to the shape of a charge retentive sheet on the drum. A slit 175 is defined in shoe 17 between central electrode portion 171 and a leading upper rim 174. Toner or fluid developer is injected from a supply such as supply port 183 in FIG. 10, through slit 175 onto the sheet. Typically, toner is injected under pressure at a rate of 0.2 gallons per minute.

Rims 172 and 173 are typically about ⅛ inch wide. Upper rim 174 is typically about ½ inch wide. The rims 172, 173 and 174 project upward less than 10 mils (250 $\mu$m), typically about 4 or 5 mils (100 to 125 $\mu$m) from the central portion 171 creating a space for flow of a thin film of fluid developer between center portion 171 and the sheet. Typically, developer flows at a speed of about 16 inches per second through the space between the center portion 171 and the sheet. The rims have an arcuate shape facing the drum with a radius of curvature which equals the radius of the drum. The rims are polished to a high degree of accuracy to assure a close fit against a sheet on the drum.

Central electrode portion 171 is a grounded conductor. Developing fluid flowing in the space between electrode 171 and a sheet is subject to an electric field in those regions where charge has been deposited onto the sheet, causing toner particles suspended in the developer to be attracted to the sheet thereby creating a visible image.

Alternatively, the central electode may be subject to a variable bias voltage from power supply 177 to compensate for variable drum speed. At a typical maximum speed of rotation, 12 inches per second, a typical bias would be zero volts. As speed decreases negative bias increases linearly. At minimum speed, say 2 inches per second a typical bias is negative 85 volts.

For a two-inch-long toning shoe 17, a sheet on the drum is in contact with developer for one-sixth second. Drum speeds as slow as two inches per second can cause sheet-developer contact times of as long as one second, which if not compensated for causes overtoning of the sheet and reduced resolution. A bias voltage on the electrode portion 171 reduces the electric field in the space between electrode and sheet by an amount sufficient to prevent overtoning.

Peripheral edges or rims 172, 173 and 174 contact the sheet near opposed lateral boundaries of an electrostatic latent image stripe on the sheet. The stripes were discussed above with reference to FIGS. 1, 3 and 4. The toning shoe 17 applies developer to a localized area corresponding to the latent image stripe. Rims 172, 173 and 174 fit close enough to the sheet on the drum to confine developer to the localized area with little, if any, leakage.

The rims are preferably insulating to prevent streaking. In dry weather the conductivity of the sheet under the surface insulating coating is reduced causing less charge to be deposited on the sheet. In addition, voltages induced in the paper by the toning process may cause toner particles to be deposited on the electrode portion 171 and also on the rims if the rims 172, 173 and 174 are conducting. Since, in the present invention the rims contact the sheet, streaking may result unless the rims are insulating.

The developer flows in the space between central electrode 171 and the sheet to a lower edge of shoe 17. A spillway 176 is defined at the lower peripheral edge of the toning shoe 17. Residual excess developer flows off the spillway, falling by gravity to a location where it is collected for recycling.

While the invention has been described with reference to developing of electrostatic latent images produced by wires or conductive tracks, the same structure may be easily adapted for developing electrostatic latent images on substrates, with latent images having been produced by other means such as ionographic writing or by electrophotographic means as in xerography. Still other applications may involve development of photographic latent images with fluid developer.

I claim:

1. Apparatus for applying fluid developer to a latent image on a sheet supported by a backing member comprising, a shoe with raised peripheral edges conforming to the shape of a supported sheet bearing a latent image stripe, said shoe having a central recessed area surrounded by said edges, said edges contacting said sheet near opposed lateral boundaries of said latent image stripe and having an opeining defined therein forming a drain, pressure means for injecting fluid developer into said recessed area thereby creating a flow of developer to said drain, means for moving said shoe relative to said sheet, and means for removing excess developer from said drain and away from said sheet.

2. The apparatus of claim 1 wherein said means for injecting fluid developer is disposed opposite said drain.

3. The apparatus of claim 1 wherein said peripheral edges form a U-shaped rim with a central member, two side members and an open end forming said drain.

4. The apparatus of claim 3 wherein said sheet is supported on a drum and said side members have curvature matching said drum.

5. The apparatus of claim 3 wherein said open end is oriented downwardly thereby forming a spillway allowing fluid developer to escape.

6. The apparatus of claim 4 wherein said shoe is moved laterally while said drum is rotating thereby scanning said sheet in a helical pattern.

7. The apparatus of claim 4 further comprising, roller means contacting said sheet at a location about said drum, spaced from said shoe, for removing excess developer from said sheet.

8. The apparatus of claim 1 wherein said peripheral edges are insulative.

9. The apparatus of claim 1 wherein said recessed area is conductive.

10. The apparatus of claim 9 wherein said recessed area is biased by a variable voltage, said voltage varying inversely in proportion to a speed of said relative motion between said shoe and said sheet.

11. The apparatus of claim 1 wherein said recessed area is spaced a distance less than ten mils from said sheet whereby a thin film of developer resides between the recessed area and the sheet, said thin film of developer being confined to a localized area of said sheet corresponding to said latent image stripe.

12. The apparatus of claim 1 wherein said means for injecting fluid developer comprises a slit defined between one of said peripheral edges and said recessed area, said slit being in communication with a supply of fluid developer under pressure.

13. The apparatus of claim 1 further comprising means for urging said toner shoe into contact against said sheet.

14. A developement electrode for use in an electrostatic printer comprising, a recessed central electrode area spaced from a sheet bearing a latent image stripe and supported on a revolving circular drum, raised left, right and upper rims around at least three sides of said electrode portion, said upper rim defining a slit, said rims conforming to and in contact with said sheet on said drum near opposed lateral boundaries of said latent image stripe, and pressure means in communication with said slit for supplying liquid toner to said space between said electrode area and said sheet.

15. The development electrode of claim 14 wherein said electrode area has a conductive surface facing said sheet.

16. The development electrode of claim 14 wherein said spacing between said electrode and said sheet is less than 10 mils.

17. The development electrode of claim 15 wherein said conductive surface is biased at a voltage varying inversely in proportion to a speed of said drum.

18. The development electrode of claim 14 further comprising a spillway defined at a lower peripheral edge of said electrode portion, opposite said upper rim, the surface of said electrode portion being curved at said lower peripheral edge away from said drum.

19. A toning shoe assembly for developing a latent image on a sheet comprising, a sheet supported on a revolving drum, said sheet bearing an outwardly facing latent image stripe, a plurality of laterally adjacent toning shoes, each shoe having raised, peripheral edges matching the curvature of the drum and a central recessed area surrounded by said edges, said edges contacting said sheet near opposed lateral boundaries of said latent inage stripe and having an opening forming a drain, pressure means for injecting fluid developer into said recessed area of each shoe thereby creating flow of developer to said drain, the developer associated with each shoe associated with a different color, means for moving said shoe relative to said sheet in a scanning pattern, and means for removing excess developer from said drain and away from said sheet.

20. The assembly of claim 19 further defined by means for recycling developer removed from each drain and injecting removed developer back into said central recessed area of the same shoe from which it is removed.

* * * * *